United States Patent
Augesky

(10) Patent No.: US 10,566,906 B2
(45) Date of Patent: Feb. 18, 2020

(54) CLOCKED POWER SUPPLY UNIT WITH GALVANIC ISOLATION

(71) Applicant: Siemens Aktiengesellschaft, Munich (DE)

(72) Inventor: Christian Augesky, Vienna (AT)

(73) Assignee: Siemens AG Österreich, Vienna (AT)

(*) Notice: Subject to any disclaimer, the term of this patent is extended or adjusted under 35 U.S.C. 154(b) by 0 days.

(21) Appl. No.: 16/300,453

(22) PCT Filed: May 5, 2017

(86) PCT No.: PCT/EP2017/060757
§ 371 (c)(1),
(2) Date: Nov. 9, 2018

(87) PCT Pub. No.: WO2017/194400
PCT Pub. Date: Nov. 16, 2017

(65) Prior Publication Data
US 2019/0229631 A1 Jul. 25, 2019

(30) Foreign Application Priority Data

May 12, 2016 (DE) ........................ 10 2016 208 227

(51) Int. Cl.
*H02M 3/335* (2006.01)
*H02M 1/08* (2006.01)
H02M 1/00 (2006.01)

(52) U.S. Cl.
CPC ......... *H02M 3/33569* (2013.01); *H02M 1/08* (2013.01); *H02M 2001/0009* (2013.01); *H02M 2001/0048* (2013.01)

(58) Field of Classification Search
CPC .......... H02M 3/16; H02M 3/22; H02M 3/225; H02M 3/335; H02M 3/33507;
(Continued)

(56) References Cited

U.S. PATENT DOCUMENTS 5,977,530 A * 11/1999 Bessho ............ H02M 3/33569
219/715
6,317,336 B1 11/2001 Yimin et al.
(Continued)

FOREIGN PATENT DOCUMENTS

AT          508912         5/2011
CN         1540691        10/2004
(Continued)

OTHER PUBLICATIONS

PCT International Search Report based on PCT/EP2017/060757 dated Jul. 19, 2017.

*Primary Examiner* — Adolf D Berhane
(74) *Attorney, Agent, or Firm* — Cozen O'Connor

(57) ABSTRACT

A power supply unit with galvanic isolation for converting an input-side alternating or direct voltage into an output-side direct voltage in a clocked manner, includes a first primary circuit that has a series circuit consisting of a primary coil of a transformer and a first switch element and a first control circuit, at least one secondary circuit that has a secondary coil of the transformer and a smoothing capacitor that is parallel to an output direct voltage of the secondary circuit, a second primary circuit that has a series circuit consisting of a part of the primary coil and a second switch element for pulse length modulation of the voltage at the part of the primary coil, and a voltage evaluator that switches either the first or the second switch element for the next switching cycle depending on the level of the input voltage in order to obviate PFC circuits or a voltage multiplication.

17 Claims, 2 Drawing Sheets

(58) Field of Classification Search
CPC ......... H02M 3/33569; H02M 3/33515; H02M 1/08; H02M 2001/009; H02M 2001/0048
USPC ... 363/20, 21.01, 21.12, 21.13, 21.16, 21.18
See application file for complete search history.

(56) References Cited

U.S. PATENT DOCUMENTS

| | | | |
|---|---|---|---|
| 6,529,389 B2* | 3/2003 | Perlick | H01F 27/06 363/142 |
| 2002/0159214 A1 | 10/2002 | Perlick et al. | |
| 2004/0240234 A1* | 12/2004 | Toda | H02M 3/3372 363/22 |
| 2008/0025051 A1* | 1/2008 | Leu | H02M 3/33569 363/20 |
| 2009/0212758 A1 | 8/2009 | Asinovski et al. | |
| 2011/0007529 A1* | 1/2011 | Usui | H02M 3/33569 363/21.12 |
| 2011/0103100 A1* | 5/2011 | Hosotani | H01F 3/10 363/21.02 |
| 2011/0216558 A1* | 9/2011 | Uno | H02M 1/4225 363/21.12 |
| 2012/0020118 A1* | 1/2012 | Takaki | H02M 1/32 363/16 |
| 2013/0027984 A1* | 1/2013 | Takegami | H02M 1/34 363/21.01 |
| 2015/0077003 A1* | 3/2015 | Vonach | H05B 33/0842 315/200 R |

FOREIGN PATENT DOCUMENTS

| | | |
|---|---|---|
| DE | 3821987 | 1/1990 |
| JP | 2007-009890 | 1/2007 |
| JP | 2010-051116 | 3/2010 |
| JP | 2010-130708 | 6/2010 |

* cited by examiner

CLOCKED POWER SUPPLY UNIT WITH GALVANIC ISOLATION

CROSS-REFERENCE TO RELATED APPLICATIONS

This is a U.S. national stage of application No. PCT/EP2017/060757 filed May 5, 2017. Priority is claimed on German Application No. 102016208227 filed May 12, 2016, the content of which is incorporated herein by reference in its entirety.

BACKGROUND OF THE INVENTION

1. Field of the Invention

The invention relates to a computer program product, a method and a power supply unit with galvanic isolation for converting an input-side alternating or direct voltage into an output-side direct voltage in a clocked manner, comprising a first primary circuit including a series circuit consisting of a primary coil of a transformer and a first switch element for the pulse length modulation of the voltage at the primary coil and a first control circuit for controlling the first switch element, and at least one secondary circuit comprising a secondary coil of the transformer and a smoothing capacitor which lies parallel to an output direct voltage of the secondary circuit.

The invention relates inter alia to a voltage converter with galvanic isolation, namely a direct voltage converter, such as a forward converter or flyback converter, or combinatorial circuit devices which generally transform electrical alternating voltage into direct voltage.

The forward converter is one embodiment of a galvanically isolated direct voltage converter, in which the energy transmission occurs exclusively in the control phase of the first switch element. Exemplary applications for this converter are combinatorial circuit devices.

Contrary to flyback converters that are particularly suited to low outputs, forward converters are used with powers from approximately 100 Watt to around 500 W, because they have an improved degree of efficiency. With larger powers, push-pull converters are used.

2. Description of the Related Art

The coverage of a very wide input voltage range, with a voltage variance of greater than 1:2, for instance, in the case of switched power supplies either results in a restriction to the alternating voltages in the input voltage or in a clear additional expense as a result of the oversizing of the flux converter or in multi-stage solutions.

With small nominal powers in the power supply unit, up to approx. 100 W, a compromise between oversizing, costs and power loss is still possible. With higher nominal powers, in addition to the inefficiency the heat development and the large volume of the power supply unit become problematic on account of the oversizing.

Instead of the oversizing, a voltage switchover has therefore previously been provided at the input of the power supply. This functions in accordance with the principle of voltage doubling and restricts operation of the power supply unit to input alternating voltages. The voltage switchover can therefore only be used in pure alternating voltage mode or with high direct current input voltages, where no voltage doubling is then required.

A further conventional solution is the upstream connection of a power factor correction filter, also known as PFC circuit (Power Factor Control Circuit). The PFC circuit enables a first localization of the voltage variance and moreover a clear reduction in the harmonic oscillations of the input current. Moreover, a PFC circuit is requested at different sites of application on account of the adherence to different limit values. With power supplies for industry, these limit values are however not so low that a PFC circuit would be necessary, they are however associated with a relatively high outlay in terms of electronics.

SUMMARY OF THE INVENTION

It is an object of the present invention to provide a power supply unit, which avoids complicated PFC circuits or a voltage multiplication and consequently enables a direct voltage operation.

This and other objects and advantages are achieved in accordance with the invention by a power supply unit with galvanic isolation, for converting an input-side alternating or direct voltage into an output-side direct voltage in a clocked manner. This power supply unit has a first primary circuit comprising a series circuit consisting of a primary coil of a transformer and a first switch element for the pulse length modulation of the voltage at the primary coil, as well as a first control circuit for controlling the first switch element, and at least one secondary circuit comprising a secondary coil of the transformer and a smoothing capacitor which lies in parallel to an output direct voltage of the secondary circuit, where a second primary circuit is provided, which comprises a series circuit of one part of the primary coil and a second switch element for the pulse length modulation of the voltage at this part of the primary coil, and where a voltage evaluation circuit is provided, which is configured to switch either the first or the second switch element for the next switching cycle depending on the level of the input voltage.

To obtain full direct voltage suitability, a constant direct voltage path must exist between the input and the switching inductor. Similarly to a 50 Hz power transformer, it is possible however to adjust this coil to the existing input voltage by tapping the input-side coil of the switching transformer, in other words by tapping the primary coil.

Similar dimensioning ratios for both 110V and also for 230V can be achieved by tapping the center of the primary coil, for instance. Accordingly, provision can be made for the second primary circuit to comprise approximately half of the primary coil.

The new second primary circuit is best activated using a second switching transistor. The voltage evaluation circuit dynamically decides which of the two switch elements and therefore which primary coil, first or second, a new switching cycle to be started is to contest.

It is useful here if the switchover from one to the other primary circuit is performed in the switching pauses. No switchover should therefore be performed via the voltage evaluation circuit, if precisely one switch element is switched on, but the switchover should instead occur in the switch-off pauses of the switch elements.

The first control circuit available for controlling the first switch element can also be connected to the second switch element, in order to also control the second switch element. As a result, the existing control circuit, as well as its current measuring facilities, can also be used for the second switch element.

It is advantageous if in synchrony with the switchover to another switch element, i.e., with a change in the primary circuit, the current default value is adjusted within the meaning of a pilot control, such as by the amplification in the current measuring path of the primary circuit likewise being changed accordingly. In this respect, provision can be made for the voltage evaluation circuit to comprise an amplifier, with which, upon a switchover from one to the other primary circuit, the current default value can be changed accordingly.

For instance, when switching over from full primary coil to half primary coil, the current has to be abruptly changed over to the double value abruptly. This adjustment can namely also be performed by an existing voltage or current regulation for the primary circuit, however, for the duration of the control setting time of the available voltage or current regulation, it would result in voltage and current jumps at the output of the switching converter.

To remedy this, provision can be made for a current measuring device with a first current measuring resistor to be provided in the primary circuit, through which current passes when the first or second switch element is switched, for a second current measuring resistor to be provided in the first primary circuit, through which current only passes when the first switch element is switched and which is dimensioned such that the voltage drop at the current measuring resistors acquired by the control circuit is just as large when the first switch element is switched as when the second switch element is switched.

Another possibility of reducing the effects of switchovers in the primary circuit to the secondary side consists in a dynamic change occurring between the two primary circuits. In this regard, provision can be made for the voltage evaluation circuit to be configured such that the switchover from one to the other primary circuit occurs gradually, by the one and the other primary circuit being switched alternately for one or more switching cycles, where the number of switching cycles of the one primary circuit is reduced and the number of switching cycles of the other primary circuit increases.

This may appear, for instance, that only one of ten switching cycles firstly occurs with the second primary circuit, in other words with only one part of the primary coil, while the other nine switching cycles still occur with the first primary circuit, in other words with the full primary coil. With the ten consecutive switching cycles, two switching cycles are already made with the second primary circuit, while only eight more switching cycles occur with the first primary circuit. With the next ten switching cycles, those with the second primary circuit are increased to three, and onwards. Such an "averaged" change is used to provide an existing voltage or current regulation with time for regulation.

The voltage evaluation circuit required for the switchover can comprise a microcontroller, which in most cases is already required to evaluate the input voltage (phase failure, etc.) and also contains the switchover algorithm for the "averaged" change. This microcontroller can also identify whether a quick changeover is required without the aforedescribed "averaging", such as when the power supply unit is switched on, where a successively increasing input voltage, such as an intermediate circuit voltage, only charges the input capacitors of the primary circuit.

To prevent the first switch element from being poled in reverse with the active second switch element, a diode can be provided between the primary coil and the first switch element.

The inventive power supply unit can be formed as a forward converter, where a free-wheeling diode arranged parallel to the secondary coil is then provided.

The inventive power supply unit can also be formed as a flyback converter, however.

It is also an object of the invention to provide a method for converting an input-side alternating or direct voltage into an output-side direct voltage in a clocked manner serves to provide a power supply unit with galvanic isolation, having a first primary circuit comprising a series circuit of a primary coil of a transformer and a first switch element for the pulse length modulation of the voltage at the primary coil and a first control circuit for controlling the first switch element, and having at least one secondary circuit comprising a secondary coil of the transformer and a smoothing capacitor which lies parallel to an output direct voltage of the secondary circuit.

A second primary circuit is provided here, which comprises a series circuit of part of the primary coil and a second switch element for the pulse length modulation of the voltage on this part of the primary coil, and a voltage evaluation circuit, which switches either the first or the second switch element for the next switching cycle as a function of the level of the input voltage.

As has already been explained in conjunction with the inventive power supply unit, the switchover from one to the other primary circuit occurs at best in the switching pauses.

The voltage evaluation circuit can comprise an amplifier, with which the current default value is changed accordingly when a switchover occurs from one to the other primary circuit.

Alternatively or in addition the switchover from one to the other primary circuit can occur gradually, by the one and the other primary circuit being switched alternately for one or more switching cycles, where the number of switching cycles of the one primary circuit is reduced and the number of switching cycles of the other primary circuit increases.

The inventive method is at best embodied in a computer-assisted manner. Consequently, the invention also relates to a computer program product, which comprises a program which can be loaded directly into a processor of a power supply unit, having program means in order to execute all steps of the inventive method when the program is executed by the processor. The computer program product may be a data carrier, for instance, on which a corresponding computer program is stored, or it may be a signal or data stream, which can be loaded into the processor of a power supply unit via a data link. The computer program can be stored in the voltage evaluation circuit, for instance.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

To further explain the invention, reference is made in the following part of the description to the figures, from which further advantageous embodiments, details and developments of the invention can be inferred. The figures are to be regarded as exemplary and are intended to illustrate the character of the invention, but does not in any way restrict it or represent it conclusively, in which.

DETAILED DESCRIPTION OF THE EXEMPLARY EMBODIMENTS

Figure 1:
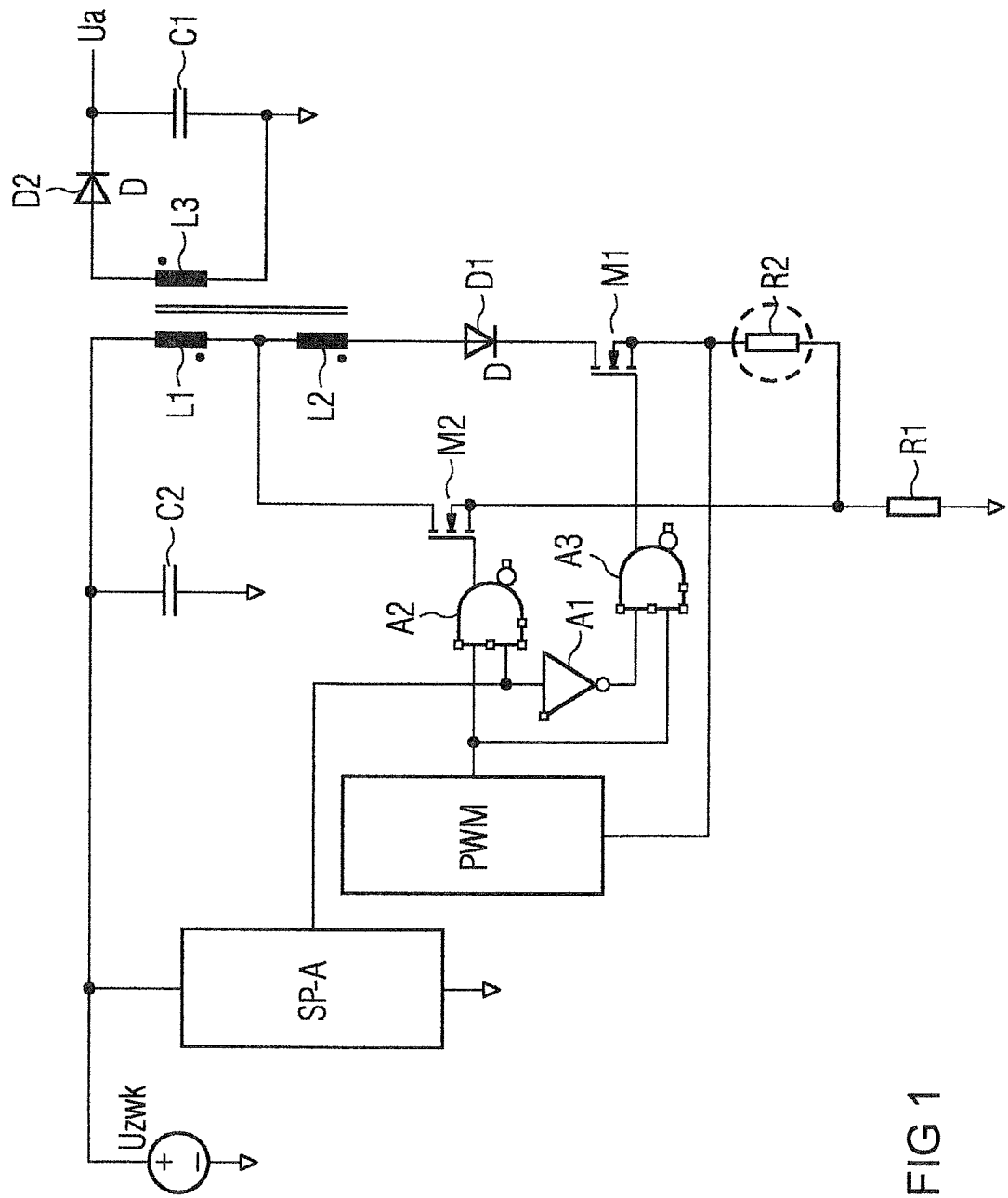
FIG. 1 is schematic illustration of the power supply unit in accordance with the invention.

FIG. 1 shows a schematic representation of an inventive power supply unit in the form of a flyback converter. The illustrated circuit arrangement comprises a first primary circuit, a second primary circuit and a secondary circuit.

The first primary circuit is formed from the series circuit of the entire primary coil L1, L2, of a transformer, of a first switch element M1, of a first current measuring device which is realized by the shunt (first current measuring resistor) R1, and of a voltage source, where the voltage source outputs the input direct voltage Uzwk. Optionally, a second current measuring resistor R2 can be provided. An input capacitor C2 is connected in parallel with the voltage source. An input of a control circuit PWM is connected to an output of the current measuring device. The voltage dropping at the first current measuring resistor R1 is proportional to the current in the first or second primary circuit and forms an input variable of the control circuit PWM. The control circuit PWM, which operates here based on a pulse width modulation, controls the first switch element M1 via the inverter A1 and the gate A3. The first switch element M1 is formed here as an n-channel MOSFET, naturally other types of transistors can also be used.

The second primary circuit is formed of the series circuit of the part L1 of the primary coil of the transformer, of a second switch element M2, of the current measuring facility, which is realized by the shunt (first current measuring resistor) R1 and of the voltage source. Part L1 of the primary coil here comprises half of the overall primary coil L1, L2. The control circuit PMW controls the second switch element M2 via the gate A2. The second switch element M2 is also formed here as an n-channel MOSFET, naturally other types of transistors can also be used here.

A diode D1 between the primary coil L1, L2 and the first switch element M1 prevents a reverse poling of the first switch element M1 when the second switch element M2 is active.

The secondary circuit comprises a secondary coil L3 of the transformer, a diode D2 and a smoothing capacitor C1. The output voltage Ua is present at the output of the secondary circuit, i.e., at the smoothing capacitor C1.

The basic function of the circuit arrangement is as follows: The first switch element M1 (or the second switch element M2) controlled by the control circuit PWM converts the input direct voltage Uzwk of the first (or of the second) primary circuit into a series of voltage pulses at the primary coil L1, L2 (or the part L1 of the primary coil). The voltage pulses effect a current through the primary coil L1, L2 (or through the part L1 of the primary coil), which induces an alternating voltage in the secondary coil L3. This alternating voltage is rectified using the diode D2.

In accordance with the invention, the voltage evaluation circuit SP-A is now switched in parallel with the voltage source, which makes the input voltage Uzwk available. The voltage evaluation circuit SP-A is connected to the inverter A1 and the gates A2, A3, where the inverter A1 serves to release the gates A2, A3 alternately. As a function of the level of the input voltage Uzwk, either the first M1 or the second switch element M2 is now switched for the next switching cycle by the voltage evaluation circuit SP-A.

If the first switch element M1 was active, for instance, and is switched over to the second switch element M2, then the current has to be transformed to the double value abruptly. One possible solution in terms of reducing the effects of the switchover consists in using the current measuring device present in the primary circuit, which is realized via a first current measuring resistor R1. The current measuring resistor R1 is present in all embodiments and current flows therethrough when either the first M1 or the second switch element M2 are switched. A second current measuring resistor R2 is now integrated in the first primary circuit, through which current only flows when the first switch element M1 is switched and which is dimensioned such that the voltage drop at the current measuring resistors R1, R2 acquired by the control circuit PWM is equally as large when the first switch element M1 is switched as when the second switch element M2 is switched.

In another embodiment for reducing the effects of the switchover, the switchover from one to the other primary circuit occurs gradually, by alternately the one and the other primary circuit being active for one or more switching cycles, where the number of switching cycles of the one primary circuit reduces and the number of switching cycles of the other primary circuit increases, as already described further above. The second current measuring resistor R2 is not absolutely necessary for this embodiment.

In this way, the impression of a switching regulator can be generated without switchover because no notable switchover interferences occur.

The algorithm with which the two switch elements M1, M2 are activated by the voltage evaluation circuit SP-A can be carried out by a computer program stored in the voltage evaluation circuit SP-A.

Figure 2:
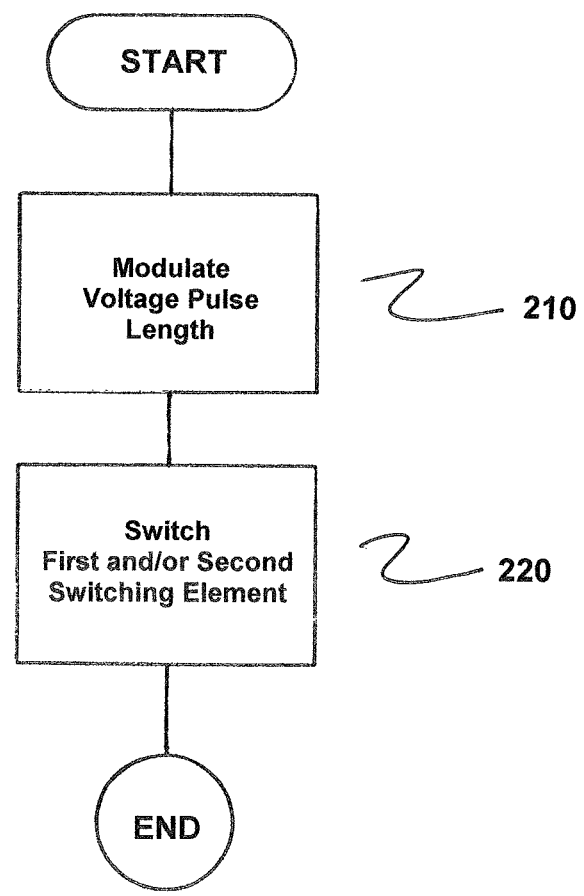
FIG. 2 is a flowchart of the method in accordance with the invention.

FIG. 2 is a flowchart of a method for converting an input-side alternating or direct voltage Uzwk into an output-side direct voltage in a clocked manner, utilizing a power supply unit with galvanic isolation, having a first primary circuit, which comprises a series circuit of a primary coil L1, L2 of a transformer and a first switch element M1 for pulse length modulation of a voltage at the primary coil and a first control circuit PWM for controlling the first switch element M1, and having at least one secondary circuit, which comprises a secondary coil L3 of the transformer and a smoothing capacitor C1 that lies parallel to an output direct voltage Ua of the secondary circuit. The method comprises modulating a pulse length of a voltage at a part L1 of the primary coil via a second primary circuit comprising a series circuit consisting of the part L1 of the primary coil and a second switch element M2, as indicated in step 210.

Next, either the first switch element M1 or the second switch element M2 for the next switching cycle is switched by a voltage evaluation circuit S-PA depending on the level of the input voltage Uzwk, as indicated in step 220.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A power supply unit with galvanic isolation for converting an input-side alternating or direct voltage into an output-side direct voltage in a clocked manner, the power supply unit comprising:
   a first primary circuit comprising a series circuit consisting of a primary coil of a transformer and of a first switch element for pulse length modulation of the voltage at the primary coil and a first control circuit for controlling the first switch element;
   at least one secondary circuit comprising a secondary coil of the transformer and a smoothing capacitor which lies parallel to an output direct voltage of the secondary circuit;
   a second primary circuit comprising a series circuit consisting of a part of the primary coil and a second switch element for the pulse length modulation of the voltage at said part of the primary coil; and
   a voltage evaluation circuit configured to switch one of (i) the first switch element and (ii) the second switch element for the next switching cycle depending on a level of the input voltage.

2. The power supply unit as claimed in claim 1, wherein the second primary circuit comprises half of the primary coil.

3. The power supply unit as claimed in claim 1, wherein the voltage evaluation circuit is configured such that switchover from one primary circuit to another primary circuit is performed during switching pauses.

4. The power supply unit as claimed in claim 2, wherein the voltage evaluation circuit is configured such that switchover from one primary circuit to another primary circuit is performed during switching pauses.

5. The power supply unit as claimed in claim 1, wherein the first control circuit for controlling the second switch element is connected to the second switch element.

6. The power supply unit as claimed in claim 1, wherein the voltage evaluation circuit comprises an amplifier, with which, when a switchover from one primary circuit to another primary circuit occurs, a current default value is accordingly changeable.

7. The power supply unit as claimed in claim 5, further comprising:
   a current measuring device including a first current measuring resistor arranged within the primary circuit, through which current passes when the first or second switch element is switched, and
   a second current measuring resistor arranged within the first primary circuit, through which current only passes when the first switch element is switched and which is dimensioned such that a voltage drop at the first and second current measuring resistors acquired by the control circuit has the same magnitude when the first switch element is switched as when the second switch element is switched.

8. The power supply unit as claimed in claim 1, wherein the voltage evaluation circuit is formed such that the switchover from one primary circuit to another primary circuit occurs gradually, by virtue of the one primary circuit and the other primary circuit being switched alternately for one or more switching cycles; and wherein a number of switching cycles of the one primary circuit reduces and the number of switching cycles of the other primary circuit increases.

9. The power supply unit as claimed in claim 1, further comprising:
   a diode arranged between the primary coil and the first switch element.

10. The power supply unit as claimed in claim 1, further comprising:
    a freewheeling diode arranged parallel to the secondary coil;
    wherein the power supply unit is configured as a forward converter.

11. The power supply unit as claimed in claim 1, wherein the power supply unit is configured as a flyback converter.

12. A method for converting an input-side alternating or direct voltage into an output-side direct voltage in a clocked manner, utilizing a power supply unit with galvanic isolation, having a first primary circuit, which comprises a series circuit of a primary coil of a transformer and a first switch element for pulse length modulation of a voltage at the primary coil and a first control circuit for controlling the first switch element, and having at least one secondary circuit, which comprises a secondary coil of the transformer and a smoothing capacitor which lies parallel to an output direct voltage of the secondary circuit, the method comprising:
    modulating a pulse length of a voltage at a part of the primary coil via a second primary circuit comprising a series circuit consisting of the part of the primary coil and a second switch element; and
    switching, by a voltage evaluation circuit, one of (i) the first switch element and (ii) the second switch element for the next switching cycle depending on the level of the input voltage.

13. The method as claimed in claim 12, wherein the switchover from one primary circuit to another primary circuit is performed during switching pauses.

14. The method as claimed in claim 12, wherein the voltage evaluation circuit comprises an amplifier, with which, when switching over from one primary circuit to the other primary circuit, a current default value is changeable.

15. The method as claimed in claim 13, wherein the voltage evaluation circuit comprises an amplifier, with which, when switching over from one primary circuit to the other primary circuit, a current default value is changeable.

16. The method as claimed in claim 12, wherein the switchover from one primary circuit to the other primary circuit occurs gradually, by the one primary circuit and the other primary circuit being switched alternately for at least one switching cycle; and
    wherein the number of switching cycles of the one primary circuit reduces and the number of switching cycles of the other primary circuit increases.

17. A non-transitory computer program product encoded with a computer program stored in a power supply unit which, when executed by executed by a processor of the power supply unit, causes conversion of an input-side alternating or direct voltage into an output-side direct voltage in a clocked manner, the computer program comprising:
    program for modulating a pulse length of a voltage at a part of a primary coil via a second primary circuit comprising a series circuit consisting of the part of the primary coil and a second switch element; and
    program for switching, by a voltage evaluation circuit, one of (i) a first switch element and (ii) the second switch element for the next switching cycle depending on the level of the input voltage.

\* \* \* \* \*